(12) United States Patent
Daleiden

(10) Patent No.: US 7,285,148 B2
(45) Date of Patent: Oct. 23, 2007

(54) SPRING-LOADED AIR CLEANER COVER

(75) Inventor: James Daleiden, Fond du Lac, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 494 days.

(21) Appl. No.: 10/680,763

(22) Filed: Oct. 7, 2003

(65) Prior Publication Data

US 2005/0072129 A1   Apr. 7, 2005

(51) Int. Cl.
B01D 46/42   (2006.01)
(52) U.S. Cl. .................. 55/385.3; 55/493; 55/498; 55/502; 55/504; 55/507; 55/509; 123/198 E; 210/352; 210/446
(58) Field of Classification Search ............... 55/385.3, 55/493, 498, 507, 509, 504, 502; 123/198 E; 210/352, 446
See application file for complete search history.

(56) References Cited

U.S. PATENT DOCUMENTS

| | | | |
|---|---|---|---|
| 2,413,769 A * | 1/1947 | Kasten | 96/391 |
| 2,761,527 A | 9/1956 | Dreznes | |
| 2,968,361 A | 1/1961 | Buckman | |
| 2,996,145 A | 8/1961 | Thornburgh | |
| 4,130,405 A | 12/1978 | Akado et al. | |
| 4,632,682 A * | 12/1986 | Erdmannsdorfer | 55/498 |
| 4,787,925 A | 11/1988 | Ansite | |
| 5,064,089 A | 11/1991 | Schultz | |
| 5,183,488 A | 2/1993 | Deering | |
| 5,429,101 A * | 7/1995 | Uebelhoer et al. | 123/572 |
| 5,531,803 A | 7/1996 | Salapow et al. | |
| 5,895,510 A | 4/1999 | Butler et al. | |
| 6,214,077 B1 | 4/2001 | Bitner et al. | |
| RE37,150 E * | 5/2001 | Anonychuk | 55/385.3 |
| 6,231,630 B1 * | 5/2001 | Ernst et al. | 55/385.3 |
| 6,348,084 B1 | 2/2002 | Gieseke et al. | |
| 6,355,077 B1 * | 3/2002 | Chittenden et al. | 55/385.3 |
| 6,413,290 B1 * | 7/2002 | Gruber | 55/507 |
| 6,471,755 B2 * | 10/2002 | Binder et al. | 96/147 |
| 6,811,585 B2 * | 11/2004 | Sakagami et al. | 55/319 |
| 2002/0073665 A1 | 6/2002 | Gieseke et al. | |

FOREIGN PATENT DOCUMENTS

EP   323786   12/1989

* cited by examiner

Primary Examiner—Duane Smith
Assistant Examiner—Minh-Chau T. Pham
(74) Attorney, Agent, or Firm—Michael Best & Friedrich LLP

(57) ABSTRACT

A filter assembly for an engine and operable to support a filter element. The filter assembly includes a housing defining a filter receiving space having a first end and a second end. The first end and second end defining an axial length therebetween. A biasing element is integrally formed as one piece with the housing and disposed adjacent the first end.

36 Claims, 6 Drawing Sheets

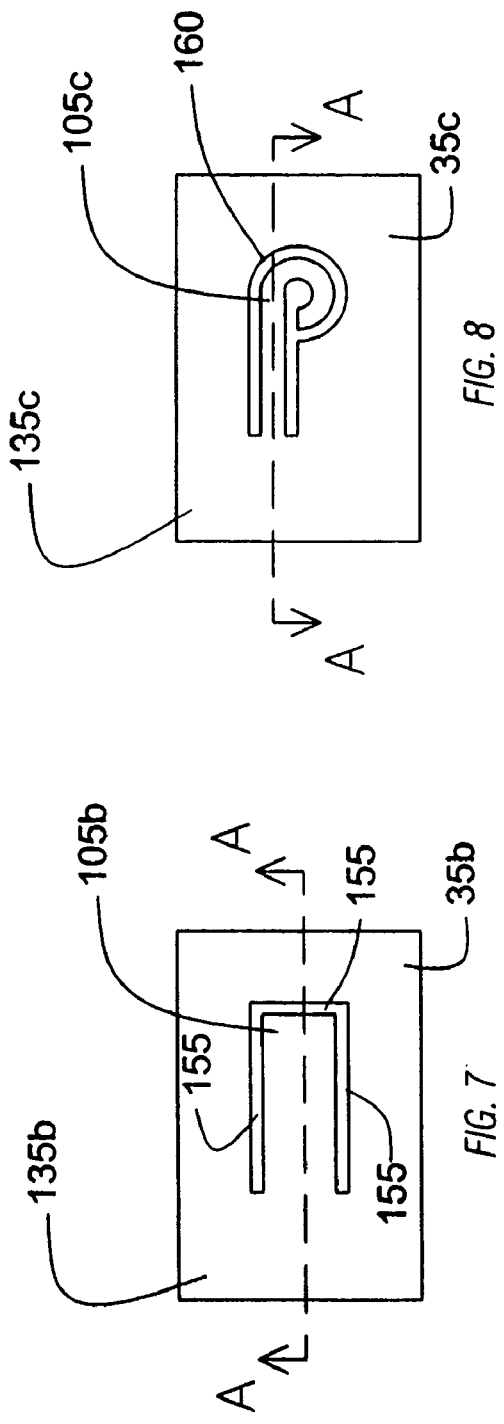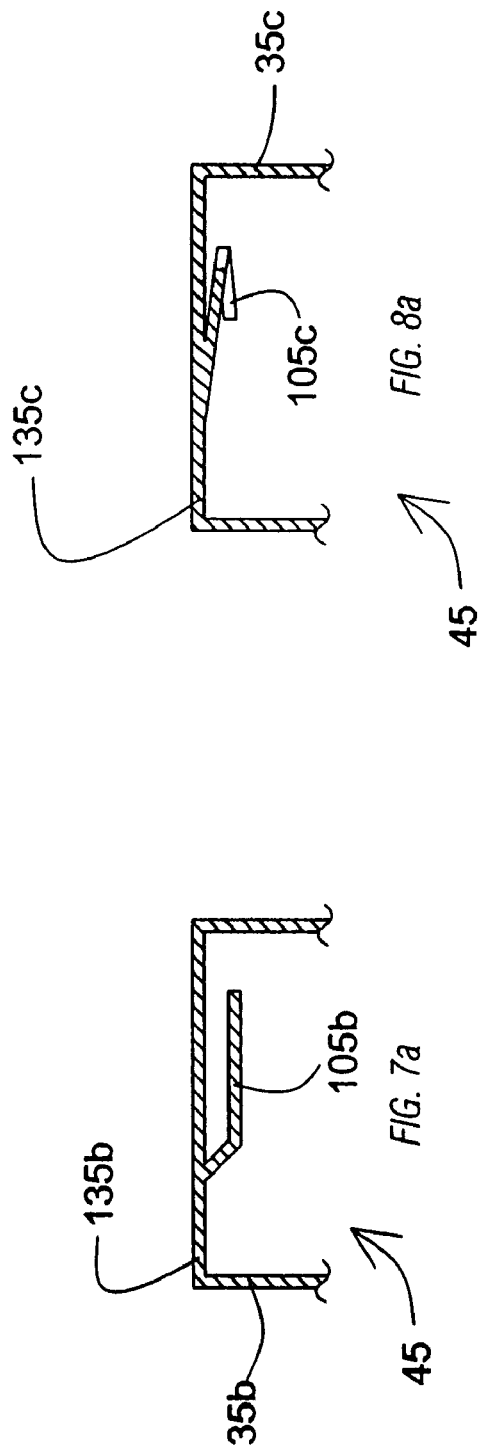

SPRING-LOADED AIR CLEANER COVER

BACKGROUND

The present invention relates generally to internal combustion engines. More particularly, the present invention relates to air cleaners for internal combustion engines.

Internal combustion engines mix air with fuel to produce a combustible fuel-air mixture. Before the air enters the engine, it often passes through an air cleaner to remove any undesirable particles (e.g., dirt, grass clippings, twigs, and the like).

Current air cleaners generally include a pleated filter media contained within a filter housing. Generally, the filter housing includes two halves that bolt together. The filter element is positioned between the two halves and the bolt is tightened until the housing makes solid contact with both ends of the filter media. Thus, the screw is used to assure that the filter media is properly seated within the housing.

Other air cleaners use simple connections to assemble the housing but require the maintenance of tight tolerances to assure that the filter element is properly positioned. The tight tolerances increase the cost associated with the manufacture of the housing.

SUMMARY

The present invention provides a filter device for an engine and operable to support a filter element. The filter device comprising a housing defining a filter receiving space having a first end and a second end. The first end and second end defining an axial length therebetween. A biasing element is integrally formed as one piece with the housing and disposed adjacent the first end.

In another aspect, the invention provides an air cleaner assembly for an engine. The assembly includes a base having a filter support and a base engagement portion, and a filter element which together define a longitudinal direction. The assembly also includes a cover including an integrally formed biasing element, and a cover engagement portion. The base engagement portion is engaged with the cover engagement portion to position the biasing member adjacent the filter element to bias the filter element in the longitudinal direction.

In yet another aspect, the invention provides a cover for use with an engine filter base and a filter element. The cover comprising a shell, a biasing element integrally formed as one piece with the shell, and an attachment member integrally formed as one piece with the shell. The attachment member is adapted to engage the filter base such that the filter element is sandwiched between the biasing element and the filter base.

The biasing element accounts for variations and tolerances in the various components that make up the air cleaner so that when the cover and the base attach to one another, they firmly clamp the filter element and inhibit rattling. In addition, the biasing element assures that contact between the base and the filter element is sufficient to maintain a seal therebetween.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 7 is a top view of another air cleaner cover;

FIG. 7a is a section view taken along line A-A of FIG. 7;

FIG. 8 is a top view of another air cleaner cover;

FIG. 8a is a section view taken along line A-A of FIG. 8;

DETAILED DESCRIPTION

Figure 1:
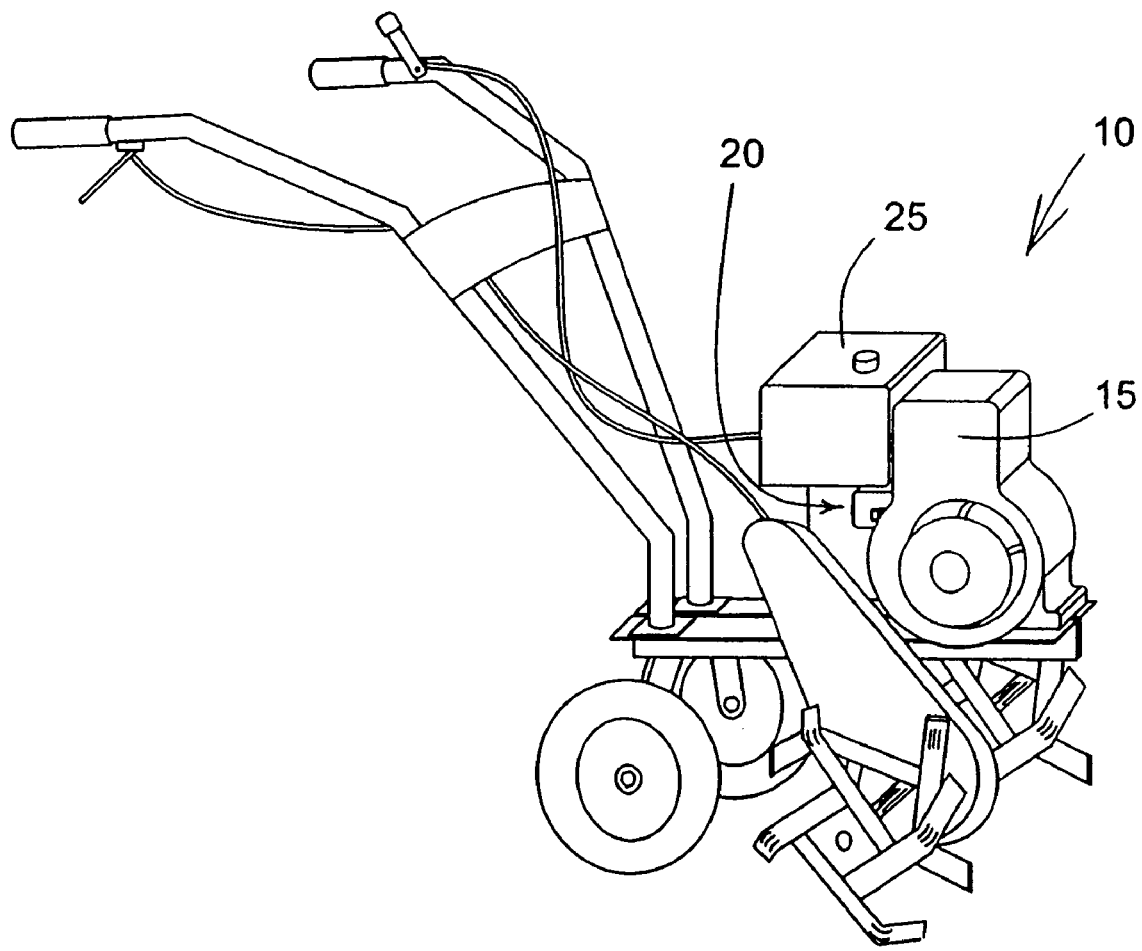
FIG. 1 is a perspective view of a rototiller including an engine.

Engines of the type described herein are well-suited to use as the source of power for outdoor power equipment such as lawn and garden maintenance equipment. One such piece of equipment, a rototiller 10 is illustrated in FIG. 1 as an example. The rototiller 10 includes an engine 15 with an air cleaner 20. The engine 15 powers the rotating blades of the rototiller 10 to till soil. Many other types of equipment may use similar engines 15 (e.g., lawnmowers, power augers, edgers, log-splitters, string-trimmers, chipper/shredders, snow throwers, pressure washers, and generators). Therefore, the invention described herein should not be limited to use with engines 15 attached to rototillers 10.

Figure 2:
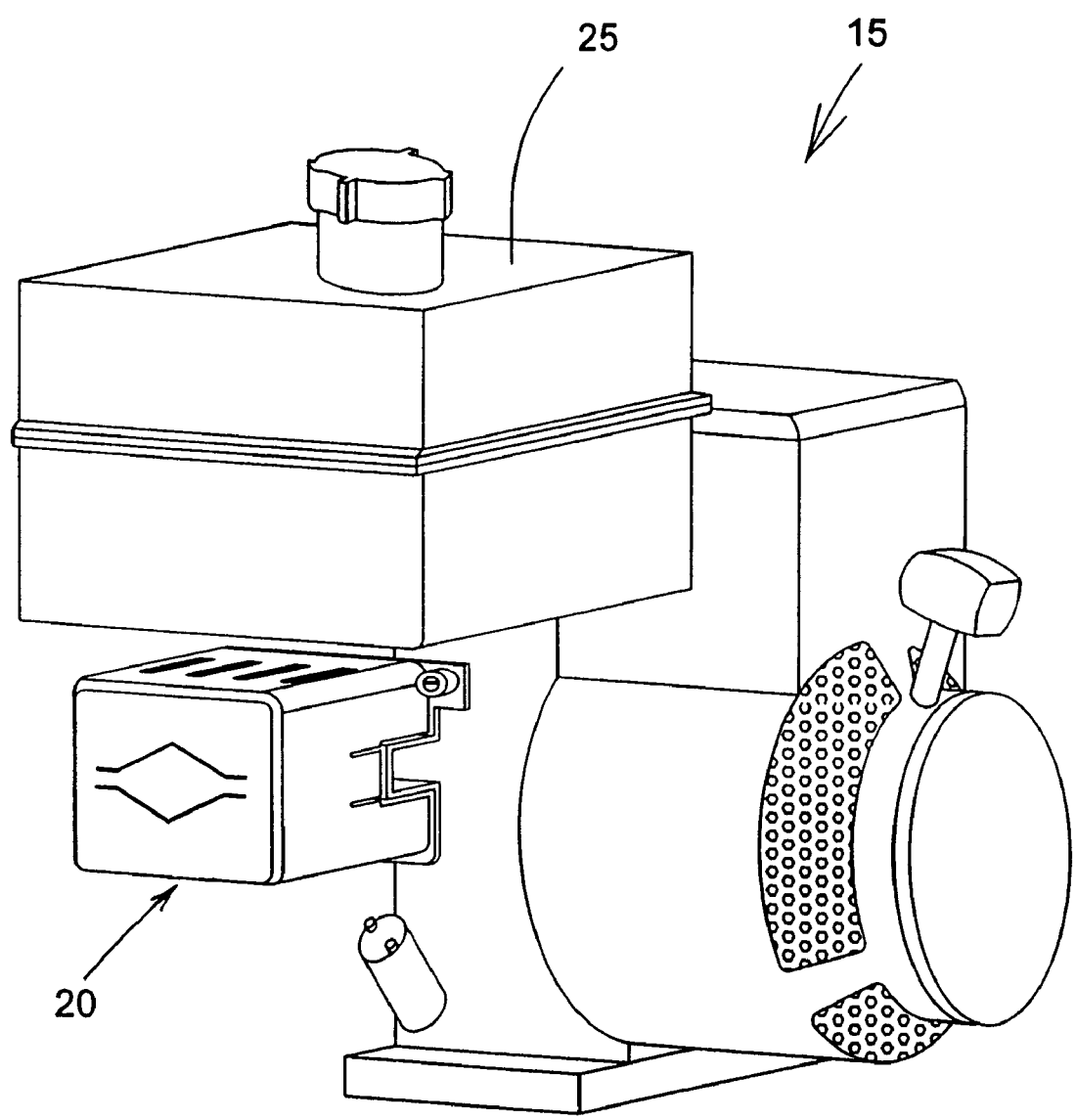
FIG. 2 is a perspective view of the engine of FIG. 1 including an air cleaner assembly.

With reference to FIG. 2, the engine 15, including the air cleaner 20, is illustrated in greater detail. The air cleaner 20 is positioned to receive dirty air from the atmosphere and deliver clean filtered air to a carburetor (not shown) or other component for use in combustion. The engine 15 also includes a fuel tank 25 that stores fuel. The fuel from the fuel tank 25 flows to the carburetor and mixes with filtered air from the air cleaner 20 to produce the combustible mixture. The combustible fuel-air mixture then flows to one or more cylinders for combustion.

Figure 3:
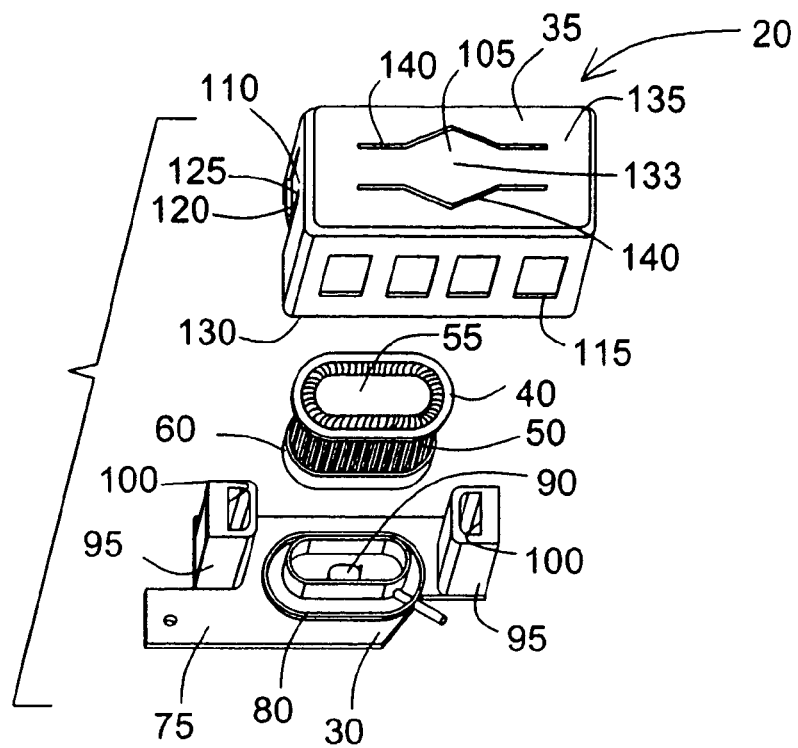
FIG. 3 is an exploded perspective view of the filter assembly of FIG. 2.

The air cleaner 20, shown in FIG. 3 and sometimes referred to herein as an air filter assembly or a filter device, includes a base 30, a cover 35, and a filter element 40. The cover 35 attaches to the base 30 to define a filter space 45. The filter space 45 is sized and shaped to receive and support the filter element 40 during engine operation. In most constructions, the base 30 and cover 35 are each formed from a plastic material that is injection molded in a single operation using a two-cavity mold. However, other constructions may use other materials (e.g., thermosetting plastic, composite, metal, ceramic, and the like) as well as other manufacturing processes (e.g., molding, casting, drawing, cold forming, fabrication, and the like). It should be noted that other constructions may employ a single piece filter device. As such, the filter device should not be limited to the foregoing arrangement.

Figure 4:
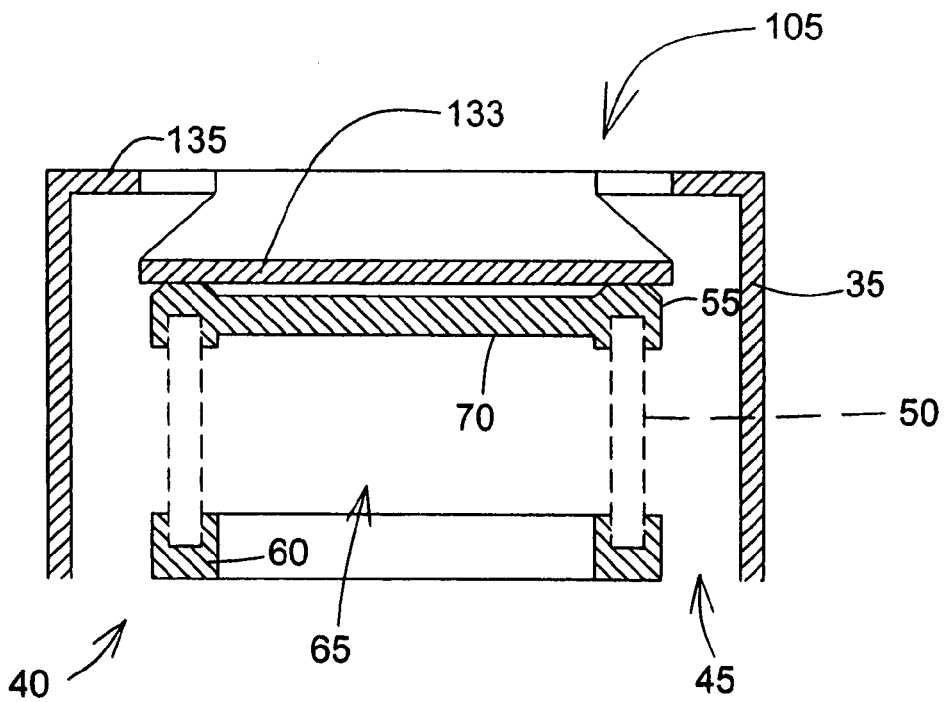
FIG. 4 is a sectional view of a filter assembly cover and a filter element.

The filter element 40, illustrated in FIGS. 3 and 4, includes a pleated paper filter media 50 sandwiched between an upper end cap 55 and a lower end cap 60. The filter element 40 is generally oval and includes a hollow opening 65 that extends from an inner surface 70 of the upper end cap 55 through the lower end cap 60. Filter elements 40 of this type are common in similar engines as well as in other internal combustion engines. Many different types of filter elements as well as different shapes of filter elements will also function with the present invention. For example, round, square, or rectangular filter elements will function with the present invention. As such, the air cleaner 20 should not be limited to oval filter elements 40 or pleated filter media 50.

Figure 6:
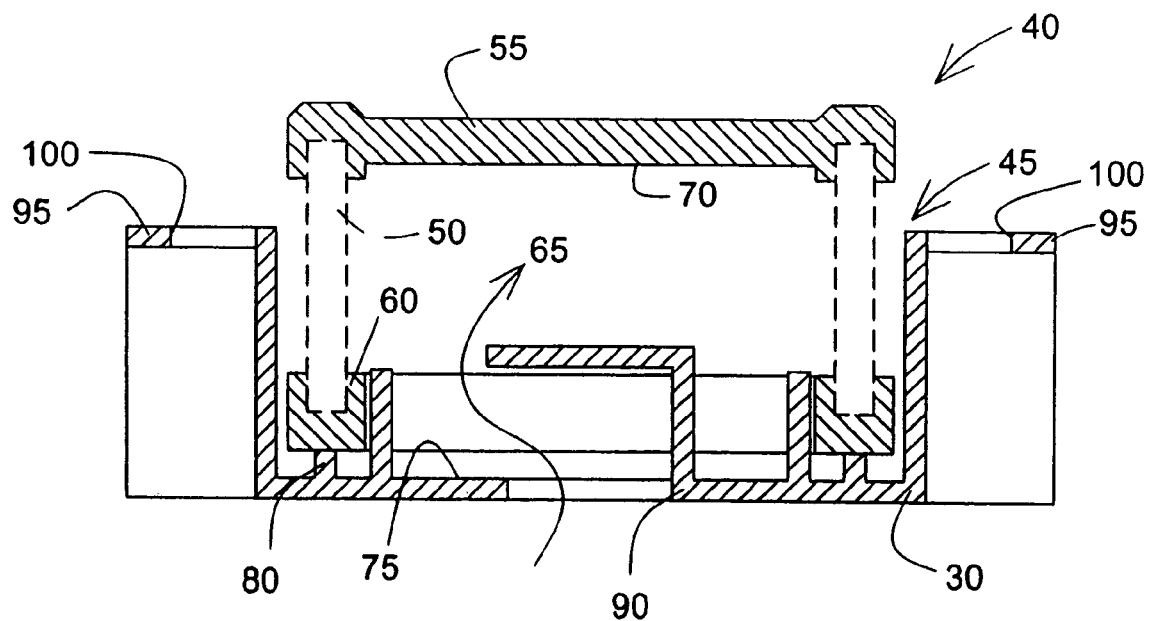
FIG. 6 is a sectional view of a filter assembly base and the filter element.

The base 30, illustrated in FIGS. 3 and 6, includes a substantially flat platform 75 that supports a filter standoff 80. The filter standoff 80 extends in a perpendicular direction from the flat platform 75. The lower end cap 60 rests on top of the standoff 80 such that the hollow opening 65 of the filter element 40 is spaced a distance above the flat platform 75. Thus, filtered air freely exits the filter element 40 and exits the air cleaner 20 through an air outlet aperture 90 formed in the flat platform 75.

The air outlet aperture 90 is provided in the base 30 to allow for the escape of the filtered air. The air outlet aperture 90 is a hole in the base 30 that provides a fluid path from the hollow opening 65 of the filter element 40 out of the air cleaner 20. In most applications, the outlet aperture 90 will directly or indirectly connect to the carburetor to allow for the delivery of filtered air.

The flat platform 75 also supports attachment pedestals 95 that include attachment apertures 100 that engage the cover 35 to attach the cover 35 to the base 30. The attachment apertures 100 are substantially rectangular openings in the attachment pedestals 95. The construction of FIG. 3 includes two attachment pedestals 95. Other constructions may include a single attachment pedestal 95 or three or more as may be required by the particular application. In other constructions, the attachment apertures 100 may be formed in the flat platform 75, thus requiring no attachment pedestals 95.

The cover 35, illustrated in FIGS. 3 and 4, includes a biasing portion 105, two tab members 110 (one shown), and a plurality of vent apertures 115. The vent apertures 115 include several square openings that are positioned to provide for the flow of air into the cover 35. In most constructions, apertures 115 are located on two sides of the cover 35, with some constructions including apertures 115 on all four sides of the cover 35. Furthermore, while several square apertures 115 are illustrated, it should be understood that any number of apertures 115 of any shape will function as desired, so long as the apertures 115 provide sufficient flow area for the admission of air into the air cleaner 20.

Each tab member 110 includes a hook portion 120 that is attached to the cover 35 by a cantilevered extension 125. The cantilevered extension 125 allows the hook portion 120 to be moved from an engaged position to a disengaged position. In the engaged position, the hook portion 120 attaches the cover 35 to the base 30 by engaging the attachment pedestal 95 adjacent the attachment apertures 100. To connect or disconnect the cover 35, the user presses the tab members 110 into their disengaged position (toward the interior of the cover 35). In the disengaged position, the hook portions 120 pass freely through the attachment apertures 100 in the attachment pedestals 95. Both tab members 110 are positioned to allow the cover 35 to be in a desired position relative to the base 30 when the two components are attached to one another. In constructions in which the base 30 includes attachment pedestals 95, the tab members 110 extend only a portion of the height of the cover 35. In constructions that do not include pedestals 95, the tab members 110 and hook portions 120 extend beyond a lowermost edge 130 of the cover 35.

The biasing portion 105, best illustrated in FIGS. 3 and 4, includes a leaf spring 133 that is integrally formed as part of a top surface 135 of the cover 35. Two slots 140 are formed in the top surface 135 of the cover 35 to allow the leaf spring 133 to move in a direction that is substantially perpendicular to the plane of the top surface 135. In many constructions, the slots 140 are formed during the molding process. However, other constructions include finishing steps that occur after the initial molding of the part that may include the addition of the slots 140.

As shown in FIG. 4, the leaf spring 133 extends into the filter space 45 to contact the upper end cap 55 before the cover 35 engages the base 30. As the cover 35 is moved toward the engaged position, the leaf spring 133 deflects to compress and retain the filter element 40. In addition, the two tab members 110 deflect inwardly as they contact the attachment pedestals 95 adjacent the attachment apertures 100. Once the hook portions 120 clear the attachment apertures 100, the tab members 110 return to their free position such that the hook portions 120 engage the pedestals 95 adjacent the attachment apertures 100, thereby attaching the cover 35 to the base 30. The biasing portion 105 allows the air cleaner 20 to compensate for variations in filter element height, hook position, pedestal height, and/or other manufacturing tolerances that may arise in the manufacturing or assembly process, or due to wear after use.

To disassemble the air cleaner 20, the user moves the hook portions 120 toward the center of the air cleaner 20 and pulls the cover 35 away from the base 30. The hook portions 120 pass through the attachment apertures 100 and the cover 35 disengages from the base 30.

It should be understood that only one possible system for the attachment of the cover 35 to the base 30 has been described with many other systems being possible. For example, other constructions may locate the attachment apertures in the cover and the hook members in the base.

Figure 5:
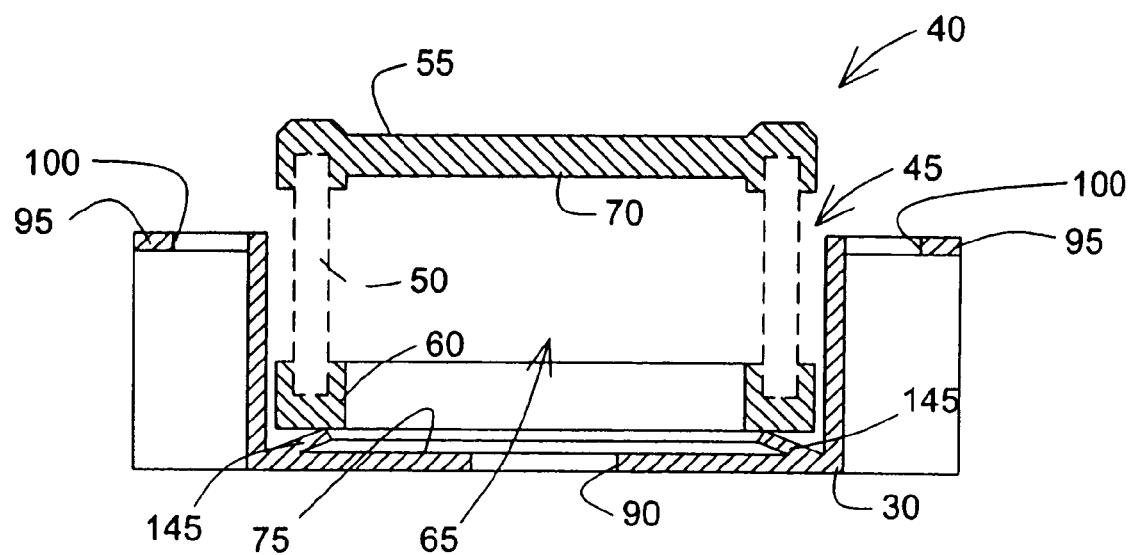
FIG. 5 is a sectional view of a filter base with a biasing portion.

One of ordinary skill will realize that there are many different arrangements of the cover 35 and/or base 30 that include an integrally-formed biasing portion 105. FIG. 5 illustrates one example in which the biasing portion 105a includes an annular cantilevered ring 145 formed as part of the base 30a. The filter element 40 sits on top of the ring 145, which compresses when the cover is attached to the base 30a. In this construction, a collar 150 surrounds the perimeter of the filter element 40 to maintain the filter element 40 in the proper position. In still other constructions, a cantilevered waved-ring (similar to a wave washer) may be integrally formed with the base.

Another example, illustrated in FIGS. 7 and 7a, includes a cantilevered biasing member 105b formed as part of the top 135b of the cover 35b. The cantilevered portion 105b is disconnected from the cover 35b along three edges 155 such that it projects into the filter space 45 inside of the cover 35b in the free state. The cantilevered portion 105b contacts the filter element (not shown) and deflects when the cover 35b is attached to the base (not shown).

FIGS. 8 and 8a illustrate another construction in which a biasing member 105c is formed in a spiral shape. A spiral cut 160 in the top 135c of the cover 35c forms a spiral arm 165 that extends into the filter space 45 of the cover 35c where it can contact the filter element (not shown) when the cover 35c is attached to the base (not shown).

Figure 9:
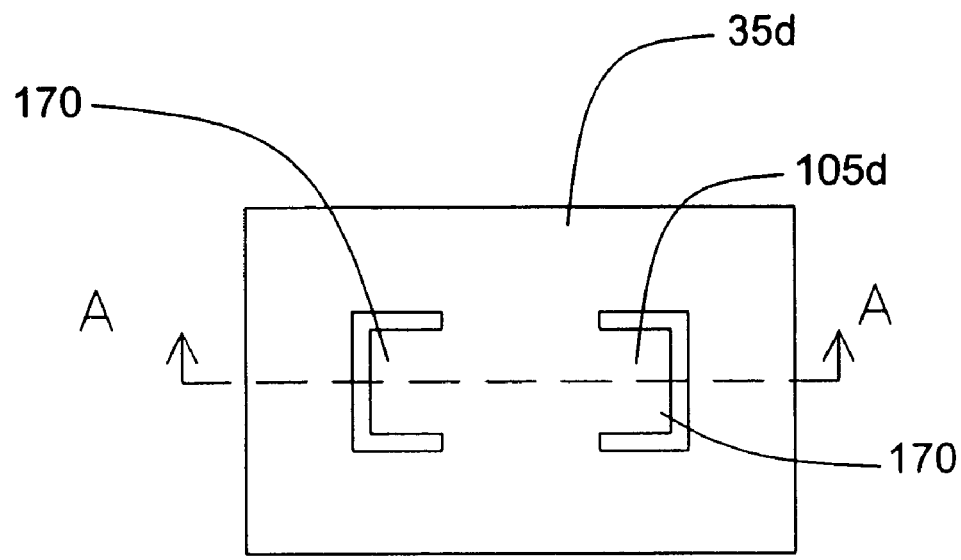
FIG. 9 is a top view of another air cleaner cover.
Figure 9A:
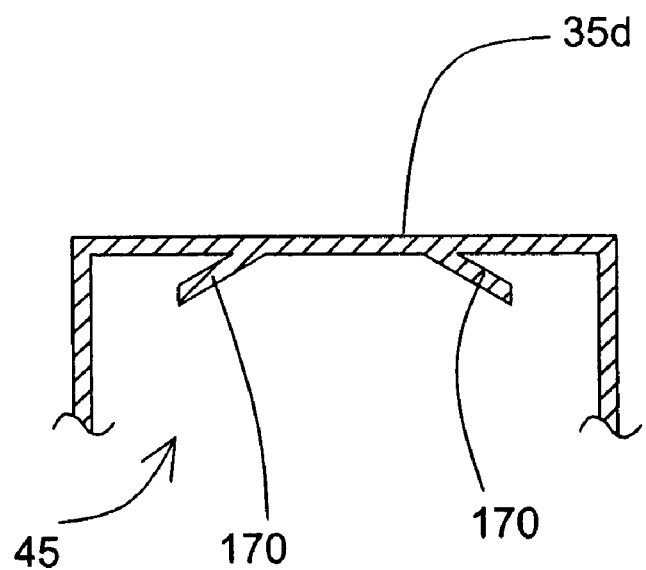
FIG. 9a is a section view taken along line A-A of FIG. 9.

In yet another variation illustrated in FIGS. 9 and 9a, a biasing element 105d is formed to include two cantilevered portions 170 that extend into the filter space 45. The two cantilevered portions 170 contact the filter element (not shown) when the cover 35d is attached to the base (not shown) and function much the same as the previous biasing elements.

As should be clear, many other biasing members are possible. As such, the invention should not be limited to those few examples described herein.

Although the invention has been described in detail with reference to certain preferred embodiments, variations and modifications exist within the scope and spirit of the invention as described and defined in the following claims.

What is claimed is:

1. A filter device for an engine and operable to support a filter element, the filter device comprising:
   a housing defining a filter receiving space having a first end and a second end, the first end and second end defining an axial length therebetween; and
   a biasing element integrally-formed as one piece with the housing and disposed adjacent the first end, wherein the biasing element includes a leaf spring formed as part of the housing, the leaf spring deflecting in response to contact with the filter element.

2. The filter device of claim 1, wherein the housing includes a first portion having a first engagement portion and a second portion having a second engagement portion.

3. The filter device of claim 2, wherein the first engagement portion includes tabs, and the second engagement portion includes slots sized to receive the tabs and interconnect the first portion to the second portion.

4. The filter device of claim 1, wherein at least one of the first end and the second end includes a radial retainer positioned to inhibit radial movement of the filter element.

5. The filter device of claim 1, wherein the leaf spring is formed as part of a top portion of the housing, and wherein the top portion deflects in response to contact with the filter element.

6. The filter device of claim 1, wherein the filter element is positioned within the filter receiving space such that the leaf spring deflects to sandwich the filter element between the leaf spring and the second end.

7. The filter device of claim 1, further comprising a filter element including a pleated filter media sandwiched between a first end cap and a second end cap.

8. The filter device of claim 7, wherein the first end cap is in contact with the leaf spring and the second end cap is in contact with the second end such that the filter element and housing cooperate to define an unfiltered space and a filtered space.

9. The filter device of claim 8, wherein the housing includes a first aperture and a second aperture, the first aperture positioned to direct air from outside of the housing into the unfiltered space within the housing, and the second aperture positioned to receive air from the filtered space and direct the air out of the housing.

10. The filter device of claim 1, wherein the housing is injection molded.

11. A filter device for an engine and operable to support a filter element, the filter device comprising:
    a housing defining a filter receiving space having a first end and a second end, the first end and second end defining an axial length therebetween; and
    a biasing element integrally-formed as one piece with the housing and disposed adjacent the first end, wherein the biasing element includes a cantilevered annular ring member.

12. The filter device of claim 11, wherein the ring member is integrally-formed with a bottom portion of the housing and wherein the bottom portion deflects in response to contact with the filter element.

13. A filter device for an engine and operable to support a filter element, the filter device comprising:
    a housing defining a filter receiving space having a first end and a second end, the first end and second end defining an axial length therebetween; and
    a biasing element integrally-formed as one piece with the housing and disposed adjacent the first end, wherein the housing includes a cover and the biasing element is formed integral with the cover, and wherein the cover includes at least one slot that at least partially defines the biasing element.

14. An air cleaner assembly for an engine, comprising:
    a base including a filter support and a base engagement portion;
    a filter element defining a longitudinal direction; and
    a cover including an integrally formed biasing element and a cover engagement portion, the base engagement portion interconnected with the cover engagement portion to position the biasing member adjacent the filter element to bias the filter element in the longitudinal direction, wherein the biasing element includes a leaf spring formed as part of the cover, the leaf spring deflecting in response to contact with the filter element.

15. The air cleaner assembly of claim 14, wherein the cover engagement portion includes at least one tab, and the base engagement portion includes at least one slot sized to receive the tab and to interconnect the cover portion to the base portion.

16. The air cleaner assembly of claim 14, wherein the leaf spring is formed as part of a top portion of the cover.

17. The air cleaner assembly of claim 14, wherein the filter element includes a pleated filter media sandwiched between a first end cap and a second end cap.

18. The air cleaner assembly of claim 17, wherein the first end cap is in contact with the base and the second end cap is in contact with the leaf spring such that the filter element, the cover, and the base cooperate to define an unfiltered space and a filtered space.

19. The air cleaner assembly of claim 1, wherein the cover includes a first aperture positioned to direct air from outside of the assembly into the unfiltered space, and wherein the base includes a second aperture positioned to receive air from the filtered space and direct the air out of the assembly.

20. The filter assembly of claim 14, wherein the base and cover are injection molded.

21. The filter assembly of claim 14, wherein the base engagement portion and the cover engagement portion are holes sized to receive a bolt.

22. An air cleaner assembly for an engine, comprising:
    a base including a filter support and a base engagement portion;
    a filter element defining a longitudinal direction; and
    a cover including an integrally formed biasing element and a cover engagement portion, the base engagement portion interconnected with the cover engagement portion to position the biasing member adjacent the filter element to bias the filter element in the longitudinal direction, wherein the biasing element is integrally-formed with a bottom portion of the base and wherein the bottom portion deflects in response to contact with the filter element.

23. An air cleaner assembly for an engine, comprising:
    a base including a filter support and a base engagement portion;
    a filter element defining a longitudinal direction; and a cover including an integrally formed biasing element and a cover engagement portion, the base engagement portion interconnected with the cover engagement portion to position the biasing member adjacent the filter element to bias the filter element in the longitudinal direction, wherein the biasing element includes a cantilevered annular ring member.

24. An air cleaner assembly for an engine, comprising:

a base including a filter support and a base engagement portion;

a filter element defining a longitudinal direction; and a cover including an integrally formed biasing element and a cover engagement portion, the base engagement portion interconnected with the cover engagement portion to position the biasing member adjacent the filter element to bias the filter element in the longitudinal direction, wherein the cover includes at least one slot that at least partially defines the biasing element.

25. A cover for use with an engine filter base and a filter element, the cover comprising:

a shell;

a biasing element integrally-formed as one piece with the shell; and an attachment portion connected to the shell and adapted to be interconnected to the filter base such that the filter element is sandwiched between the biasing element and the filter base, wherein the shell, biasing element, and attachment portion are injection molded as a single component.

26. A cover for use with an engine filter base and a filter element, the cover comprising:

a shell;

a biasing element integrally-formed as one piece with the shell; and an attachment portion connected to the shell and adapted to be interconnected to the filter base such that the filter element is sandwiched between the biasing element and the filter base, wherein the biasing element includes a leaf spring.

27. The cover of claim 26, wherein the shell includes at least one aperture.

28. The cover of claim 26, wherein the attachment portion includes a tab, and the base includes a slot adapted to receive and engage the tab.

29. The cover of claim 26, wherein the attachment portion includes a slot, and the base includes a tab, the slot adapted to receive and engage the tab.

30. The cover of claim 26, wherein the cover further includes a second attachment portion.

31. The cover of claim 26, wherein the leaf spring applies a force to the filter element, the force biasing the filter element toward the base.

32. The cover of claim 26, wherein the cover includes a first aperture positioned to direct air from outside of the cover into the unfiltered space within the cover.

33. The cover of claim 26, wherein the attachment portion is a hole sized to receive a bolt.

34. The cover of claim 26, wherein the attachment portion includes a cantilevered tab member integrally formed as part of the shell.

35. A cover for use with an engine filter base and a filter element, the cover comprising:

a shell;

a biasing element integrally-formed as one piece with the shell;

an attachment portion connected to the shell and adapted to be interconnected to the filter base such that the filter element is sandwiched between the biasing element and the filter base; and a slot that at least partially defines the biasing element.

36. The cover of claim 35, further comprising a second slot disposed a distance from the first slot, the first slot and second slot cooperating to at least partially define the biasing element.

* * * * *